United States Patent
Peters et al.

(10) Patent No.: US 9,062,642 B2
(45) Date of Patent: Jun. 23, 2015

(54) FUEL INJECTOR WITH VARIABLE SPRAY

(75) Inventors: Lester L. Peters, Columbus, IN (US); David L. Buchanan, Westport, IN (US)

(73) Assignee: Cummins Inc., Columbus, IN (US)

( * ) Notice: Subject to any disclaimer, the term of this patent is extended or adjusted under 35 U.S.C. 154(b) by 426 days.

(21) Appl. No.: 13/052,950

(22) Filed: Mar. 21, 2011

(65) Prior Publication Data

US 2011/0232606 A1    Sep. 29, 2011

Related U.S. Application Data

(60) Provisional application No. 61/316,505, filed on Mar. 23, 2010.

(51) Int. Cl.
*F02M 61/08* (2006.01)
*F02M 51/06* (2006.01)
*F02M 61/18* (2006.01)

(52) U.S. Cl.
CPC ....... *F02M 51/0603* (2013.01); *F02M 61/1806* (2013.01); *F02M 2200/703* (2013.01)

(58) Field of Classification Search
CPC ... F02M 61/08; F02M 61/045; F02M 61/182; F02M 61/47; F02M 61/06; F02M 61/10; F02M 61/42; F02M 61/1813; F02M 2200/46; F02M 45/086
USPC ................. 123/445, 498, 500, 501, 503, 504; 251/129.01, 129.02, 129.18; 239/533.1
See application file for complete search history.

(56) References Cited

U.S. PATENT DOCUMENTS

| | | | |
|---|---|---|---|
| 2,035,203 A | 3/1936 | Smith | |
| 4,077,374 A | 3/1978 | Willmann et al. | |
| 4,195,783 A * | 4/1980 | Hulsing | 239/533.3 |
| 4,408,722 A | 10/1983 | Frelund | |
| 4,417,694 A * | 11/1983 | Claxton et al. | 239/533.12 |
| 4,750,675 A | 6/1988 | Sczomak | |
| 4,905,908 A | 3/1990 | Sczomak | |
| 4,909,444 A * | 3/1990 | Sczomak | 239/453 |
| 5,482,018 A | 1/1996 | Potz et al. | |
| 5,671,716 A | 9/1997 | Hetrick et al. | |
| 5,836,521 A | 11/1998 | Holm et al. | |
| 5,878,961 A * | 3/1999 | Mueller et al. | 239/453 |
| 5,884,848 A | 3/1999 | Crofts et al. | |
| 5,979,803 A | 11/1999 | Peters et al. | |
| 6,109,549 A * | 8/2000 | Radue et al. | 239/533.12 |
| 6,224,001 B1 | 5/2001 | Cooke et al. | |
| 6,279,840 B1 * | 8/2001 | Buckley | 239/533.4 |

(Continued)

FOREIGN PATENT DOCUMENTS

WO    2006077472 A1    7/2006

*Primary Examiner* — Hai Huynh
*Assistant Examiner* — Gonzalo Laguarda
(74) *Attorney, Agent, or Firm* — Faegre Baker Daniels LLP

(57) ABSTRACT

A fuel injector is provided that creates variable spray characteristics to effectively reduce emissions, such as NOx emissions and particulate matter. The injector includes a nozzle valve element of the outwardly opening type including a fuel delivery passage and spray holes. The nozzle valve element is operable to move to a low lift position to cause fuel flowing from the spray holes to impinge on the injector body and to deflect toward the combustion chamber, and to move to a high lift position to cause fuel flowing from the spray holes to avoid impingement on injector body and flow in an obstructed manner directly into the combustion chamber. An annular chamber may be formed in the nozzle valve element adjacent the spray holes to receive fuel.

12 Claims, 2 Drawing Sheets

(56) References Cited

U.S. PATENT DOCUMENTS

| | | |
|---|---|---|
| 6,364,221 B1 | 4/2002 | Czimmek |
| 6,431,472 B1 | 8/2002 | Tian et al. |
| 6,513,487 B1 * | 2/2003 | Jorach et al. .................. 123/299 |
| 6,631,854 B1 | 10/2003 | Stier |
| 7,185,832 B2 | 3/2007 | Kaden et al. |
| 7,363,914 B2 | 4/2008 | Hoffmann et al. |

* cited by examiner

FUEL INJECTOR WITH VARIABLE SPRAY

TECHNICAL FIELD

The present inventions relate generally to fuel injection systems and, more particularly, to a fuel injector and method for improved fuel spray characteristics.

BACKGROUND OF THE INVENTION

In many fuel supply systems applicable to internal combustion engines, fuel injectors are used to inject fuel pulses into the engine combustion chamber. A commonly used injector is a closed-nozzle injector which includes a nozzle assembly having a spring-biased nozzle valve element positioned to control a flow of high pressure fuel into the cylinder. The nozzle valve element also functions to provide a deliberate, abrupt end to fuel injection, thereby preventing a secondary injection which causes unburned hydrocarbons in the exhaust. The nozzle valve element is positioned in the injector cavity and biased, for example, by a bias spring, so that when an actuation force exceeds the biasing forces acting on the element, the nozzle valve element moves to allow fuel to pass into the combustion chamber, thus marking the beginning of the injection event.

Internal combustion engine designers have increasingly come to realize that substantially improved fuel supply systems are required in order to meet the ever increasing governmental and regulatory requirements of emissions abatement and increased fuel economy. Therefore, such designers are continually searching for ways to improve control over fuel injection to help meet the economically and governmentally mandated demands for increasing fuel economy and reduced air pollution.

SUMMARY OF THE INVENTION

The inventions herein achieve the advantages described herein, and other advantages, by providing a fuel injector for injecting high pressure fuel into a combustion chamber of an internal combustion engine, comprising an injector body containing an injector cavity and including a valve seat, and a nozzle valve element positioned in said injector cavity, wherein the nozzle valve element includes a valve surface positioned adjacent the valve seat. The injector also includes a fuel delivery passage, and a plurality of spray holes fluidically connected to the fuel delivery passage. The nozzle valve element is operable to move between a closed position with the valve surface positioned in sealing abutment with the valve seat to block fuel flow from the plurality of spray holes and an open position permitting flow from the spray holes. The nozzle valve element moves outwardly away from the injector body when moving from the closed position toward the open position, wherein the open position includes a first lift position and a second lift position having a greater lift than the first lift position. At least one of the plurality of spray holes is positioned adjacent the injector body when the nozzle valve element is in the first lift position to cause fuel flowing from the at least one spray hole to impinge on the injector body and deflect toward the combustion chamber. The at least one spray hole is positioned adjacent the injector body when the nozzle valve element is in the second lift position to cause fuel flowing from the at least one spray hole to avoid impingement on the injector body. The injector also includes a nozzle valve actuator assembly adapted to move the nozzle valve element toward the open position.

The nozzle valve element may further include an annular groove formed adjacent the plurality of spray holes to receive fuel from the plurality of spray holes when the nozzle valve element is in the closed position. The fuel delivery passage may extend axially along a central longitudinal axis of the nozzle valve element. The injector body may further include a fuel supply port to receive high pressure fuel. The nozzle valve element may include a transfer passage extending transverse, and fluidically connected, to the fuel delivery passage to receive high pressure fuel from the fuel supply port. The nozzle valve actuator assembly may include a piezoelectric actuator and a drive plunger positioned axially between the piezoelectric actuator and the nozzle valve element. The nozzle valve actuator assembly may further include a hydraulic chamber to receive fuel to form a hydraulic link to transfer motion from the drive plunger to the nozzle valve element. The nozzle valve actuator assembly may further include a bias spring positioned in the hydraulic chamber to bias the nozzle valve element toward the closed position.

In another exemplary embodiment, the invention includes a fuel injector for injecting high pressure fuel into a combustion chamber of an internal combustion engine, comprising an injector body containing an injector cavity and including a valve seat, and a nozzle valve element positioned in the injector cavity. The nozzle valve element includes a valve surface positioned adjacent the valve seat, a fuel delivery passage, and a plurality of spray holes fluidically connected to the fuel delivery passage. The nozzle valve element may be operable to move between a closed position with the valve surface positioned in sealing abutment with the valve seat to block fuel flow from the plurality of spray holes and an open position permitting flow from the spray holes. The nozzle valve element is operable to move outwardly away from the injector body when moving from the closed position toward the open position. The nozzle valve element further includes an annular groove formed adjacent the plurality of spray holes to receive fuel from the plurality of spray holes when the nozzle valve element is in the closed position. The injector further includes a nozzle valve actuator assembly adapted to move the nozzle valve element toward the open position.

These and other advantages and features of the present invention will become more apparent from the following detailed description of the preferred embodiments of the present invention when viewed in conjunction with the accompanying drawings.

DETAILED DESCRIPTION OF THE PREFERRED EMBODIMENT

Figure 1:
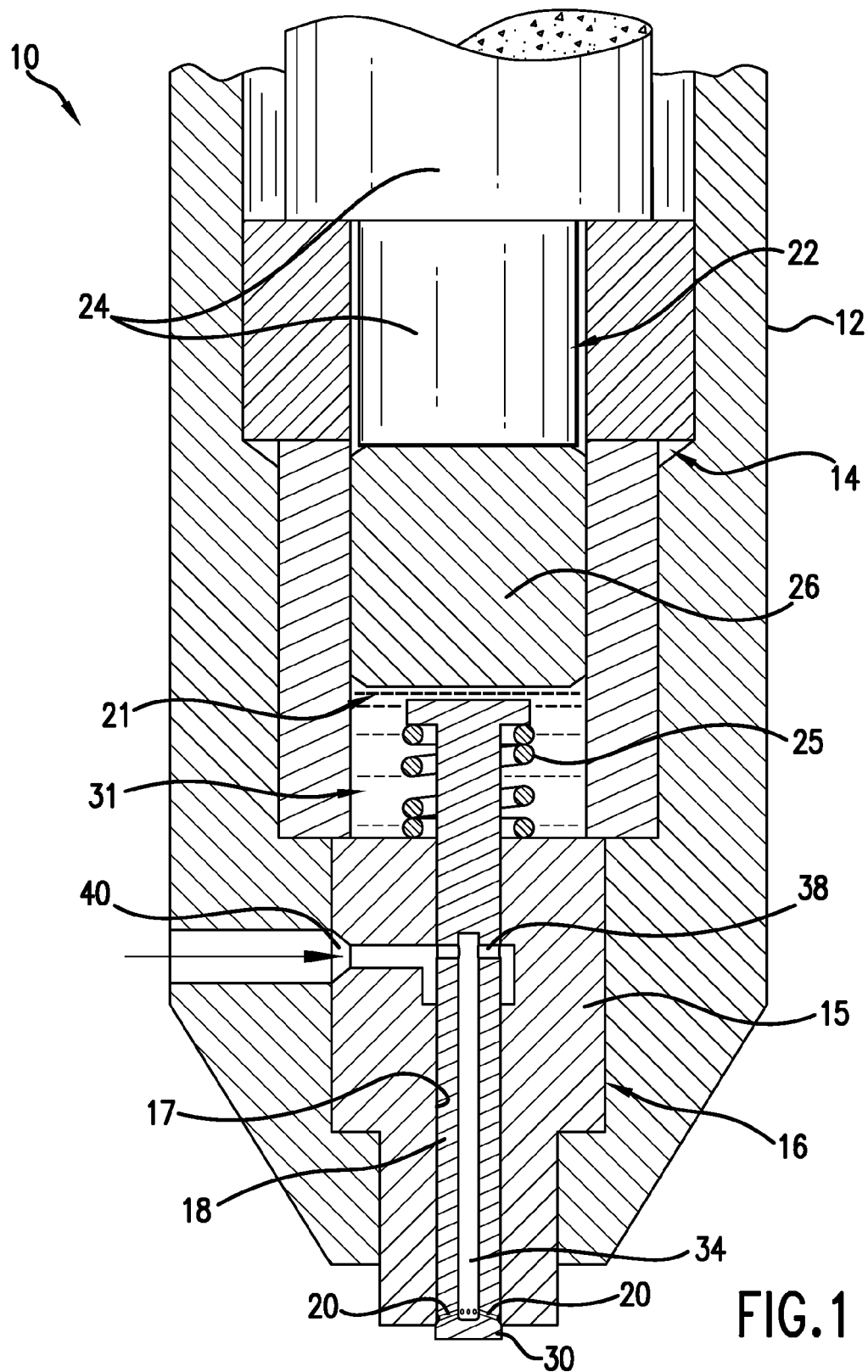
FIG. 1 is a cross-sectional view of a portion of an injector of an exemplary embodiment of the present invention.

Referring to FIG. 1, there is shown one embodiment of the fuel injector of the present invention indicated generally at 10 which includes an injector body 12 having a generally elongated, cylindrical shape which forms an injector cavity 14. The inner portion of fuel injector body 12 includes a closed nozzle assembly, indicated generally at 16, which includes a nozzle valve element 18 having injector orifices or spray holes 20 formed therein. Nozzle valve element 18 is reciprocally mounted for opening and closing the plurality of spray holes 20, thereby controlling the flow of injection fuel into an engine combustion chamber (not shown).

Closed nozzle assembly 16 also includes a nozzle housing 15 including a bore 17 sized to form a close sliding fit with nozzle valve element 18 to permit reciprocal sliding movement of nozzle valve element 18 in bore 17 while creating a substantial fluid seal along the interface. Nozzle housing 15 includes an annular valve seat 23 for sealing abutment by nozzle valve element 18 when in the closed position. Injector body 12 also includes one or more additional housings, such as an actuator housing connected to nozzle housing 15 in any appropriate manner, such as being positioned in compressive abutting relationship using for example an outer retainer such as shown in U.S. Pat. No. 5,979,803, the entire contents of which is hereby incorporated by reference.

Fuel injector 10 further includes a nozzle valve actuator assembly 22 adapted to move nozzle valve element 18 toward the open position. Nozzle valve actuator assembly 22 includes a piezoelectric actuator 24 positioned in the upper portion of injector cavity 14 and a drive plunger 26 operatively connected to the inner end of piezoelectric actuator 24. Piezoelectric actuator 24 may comprise a columnar laminated body of thin disk-shaped elements each having a piezoelectric effect. When a voltage, i.e. +150 volts, is applied to each element, the element expands along the axial direction of the column. Conversely, when a voltage of −150 volts is applied to each element, the element contracts so that the inner end of piezoelectric actuator 24 moves away from closed nozzle assembly 16. Piezoelectric actuator 24 may include any type or design of piezoelectric actuator capable of actuating nozzle valve element 18 as described hereinbelow. The expansion/contraction of piezoelectric actuator 24 is directly transmitted to drive plunger 26, thereby causing plunger 26 to reciprocate. In other embodiments, the movement of piezoelectric actuator 24 may be indirectly transmitted to drive plunger 26 using an intermediate element.

Nozzle valve actuator assembly 22 also includes a hydraulic chamber 31 formed in injector cavity 14 adjacent the inner end of drive plunger 26. Plunger 26 slidably reciprocates within injector cavity 14 so as to expand and contract the volume of hydraulic chamber 31 thereby forming a hydraulic link 21 operatively connecting drive plunger 26 and nozzle valve element 18. Preferably piezoelectric actuator 24 is directly connected to drive plunger 26 which in turn is directly connected to nozzle valve element 18 via the hydraulic link 21. Therefore expansion of the piezoelectric actuator 24 causes movement of nozzle valve element 18 outwardly toward an open position, and contraction of piezoelectric actuator 24 causes inward movement of nozzle valve element 18 toward a closed position. Drive plunger 26 is preferably sized with a larger diameter than nozzle valve element 18 to provide stroke amplification, while hydraulic link 21 provides both wear compensation and thermal compensation by being variable in length.

Figure 2:
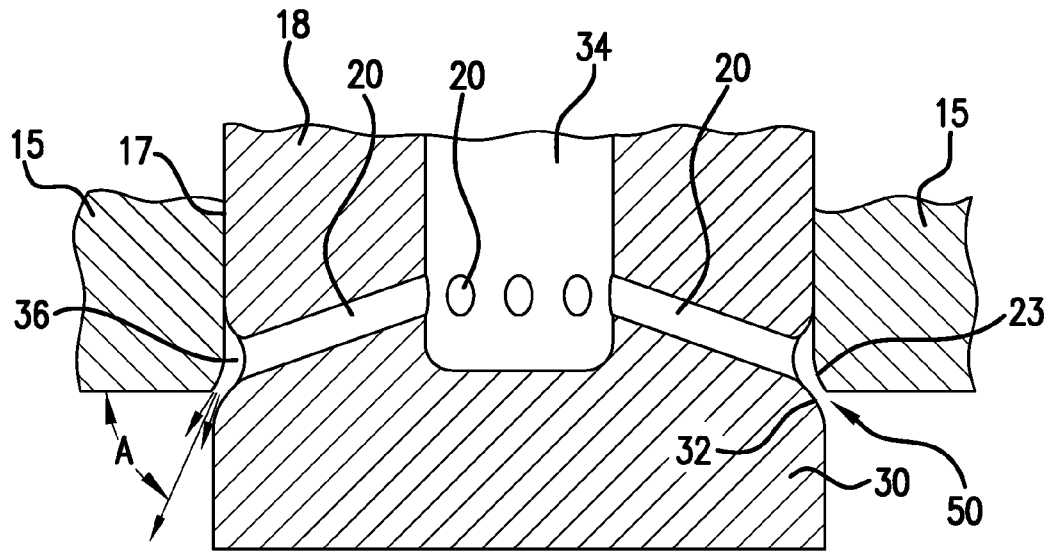
FIG. 2 is an expanded cross-sectional view of the nozzle valve assembly of the injector of FIG. 1 with the nozzle valve element in the low lift position.

Closed nozzle valve assembly 16 is of the outwardly opening type wherein the end of nozzle valve element 18 moves outwardly away from the injector body 12 out of bore 17 toward an open position (FIGS. 2 and 3) and inwardly into bore 17 toward injector body 12 toward a closed position (FIG. 1) in sealing abutment with valve seat 23. Nozzle valve element 18 includes a larger valve head portion 30 including a valve surface 32 extending annularly around head portion 30 and shaped to sealingly abut valve seat 23 when nozzle valve element 18 is in the closed position (FIG. 1). Nozzle valve element 18 further includes a fuel delivery passage 34 positioned to deliver high pressure fuel through element 18 to spray holes 20. In the exemplary embodiment, fuel delivery passage 34 extends axially along a central longitudinal axis of nozzle valve element 18 terminating near the distal end of nozzle valve element 18 to fluidically connect with spray holes 20. Spray holes 20 each extend from fuel delivery passage 34 through nozzle valve element 18 to an annular groove 36 formed in nozzle valve element 18 as discussed hereinbelow.

The opposite end of nozzle valve element 18 extends into hydraulic chamber 31 for receiving a drive force applied by hydraulic link 21, drive plunger 26, and piezoelectric actuator 24 of nozzle valve actuator assembly 22. A bias spring 25, positioned in hydraulic chamber 31, acts on the outer end of nozzle valve element 18 to bias nozzle valve element 18 toward the closed position. Nozzle valve element 18 further includes a transverse passage 38 extending transversely through nozzle valve element 18 to fluidically connect an outer end of fuel delivery passage 34 with a high pressure fuel supply. Injector body 12, and in the exemplary embodiment, nozzle housing 15, includes a fuel supply port 40 positioned to communicate with bore 17 at one end and a high pressure fuel supply at an opposite end. Fuel supply port 40 connects with bore 17 at a point along the length of bore 17 such that transverse passage 38 is in constant communication with fuel supply port 40 throughout reciprocal movement of nozzle valve element 18 between open and closed positions. Fuel supply port 40 is supplied with high pressure fuel from any conventional fuel system capable of delivering a supply of fuel pressurized to a desired level for injection, i.e. such as a conventional high pressure common rail system or a system capable of cyclically delivering high pressure fuel to supply circuit 52. Also, it should be noted that the inner portion of fuel injector body 12 is shown as only one exemplary embodiment. A practical form, and other forms, of the injector would necessarily require the inner portion of the injector body 12 to be formed in at least two separate pieces held together in a compressive relationship by, for example, a retainer such as disclosed in U.S. Pat. No. 4,022,166, the contents of which is hereby incorporated by reference. Specifically, it is desirable to form bore 17 in one injector housing structure and hydraulic chamber 31 in a separate structure as shown but additional injector body structures may be used.

Figure 3:
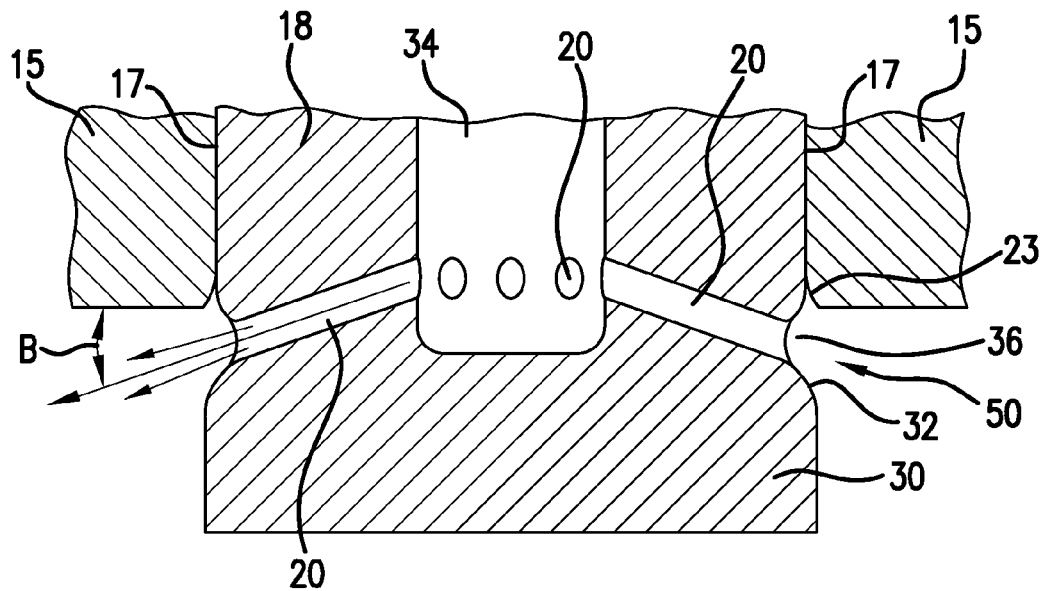
FIG. 3 is an expanded cross-sectional view of the nozzle valve assembly of the injector of FIG. 1 with the nozzle valve element in the high lift position.

The injector of the present inventions effectively provides variable spray characteristics to effectively reduce emissions, such as NOx emissions and particulate matter. Specifically, injector 10 effectively creates a first fuel spray downstream of valve seat 23, i.e., into a combustion chamber of an engine, when nozzle valve element 18 is in a first or low lift position (FIG. 2), e.g. 0.2 mm opening, that has a hollow cone shape and/or a deep angle spray profile with very small drops of fuel and low penetration into the combustion chamber, and also effectively creates a second fuel spray comprised of unobstructed individual spray plumes with a shallow angle spray profile injected directly into the combustion chamber for deep penetration and good mixing when the nozzle valve element is in a second or high lift position (FIG. 3). With respect to the low lift position creating the hollow cone/deep angle profile, such spray characteristics may be desirable whenever fuel is introduced early in the compression stroke of an engine, such as during engine low load and idle conditions, when the cylinder (combustion chamber) pressure is relatively low which permits fuel penetration. Individual spray plumes directed into the combustion chamber, and especially individual spray plumes directly injected into the combustion chamber at a shallow angle more toward the side walls of the cylinder liner defining the combustion chamber, during an early portion of a compression stroke when cylinder pressure is low, may result in fuel impingement on the cylinder liner. By providing a hollow cone and/or directing the fuel spray from the valve seat in a more downward (vertical in FIG. 2) path at a deep angle A away from the cylinder walls, the fuel can be more effectively mixed with the combustion chamber air/gas without cylinder wall impingement thereby minimizing particulates and emissions. This low lift position or mode is especially advantageous during early pre-mixed fuel injection.

The low lift spray profile is achieved by positioning the outlets of the spray holes 20 relative to the injector body upstream of the valve seat 23, and providing annular groove 36 to receive the flow from spray holes 20, such that the fuel fills annular groove 36 between injection events when nozzle valve element 18 is in a closed position. As such, when nozzle valve element 18 moves from the closed position toward a low lift position, the fuel flows from annular groove 36 through the gap 50 formed at valve seat 23 circumferentially around the entire gap to form a hollow cone. Moreover, preferably, the valve seat 23 is formed with an angle sufficient to direct the fuel away from the cylinder walls into the cone shape at the deep angle A and more toward the centerline of the combustion chamber. As the initial volume of fuel in the annular groove 36 is passing out of the groove, the fuel flowing from the outlets of the spray holes 20 will impinge on the injector body forming bore 17 and/or valve seat 23 and be deflected/directed toward downwardly toward the combustion chamber into a deep angle hollow cone or possibly deep angle individual or overlapping plumes, depending on the extent of opening of nozzle valve element 18, and the number and/or size of spray holes positioned around nozzle valve element 18. In the exemplary embodiment, the entire flow of fuel from each spray hole 20 impinges injector body 12, i.e. nozzle housing 15, causing the entire flow, not a portion of the flow, to be deflected into a deep angle.

During other engine operating conditions, such as high load, when injection may occur closer to top dead center of an engine piston's movement when cylinder pressure is high, nozzle valve element 18 may move into a second or high lift position (FIG. 3) farther out of the bore 17 than the low lift position. In the high lift position, the outlets of spray holes 20 are positioned outward of the injector body, i.e., valve seat 23, causing fuel flow from spray holes 20 to avoid impingement on the injector body by flowing freely in an unobstructed manner directly from the spray hole outlets into the combustion chamber. Thus the fuel spray from holes 20 extend as individual spray plumes into the combustion chamber at a shallow angle B to provide greater fuel penetration into the combustion chamber to achieve enhanced fuel-air mixing. The high lift position may be achieved in series immediately following the low lift position.

During operation, prior to an injection event, piezoelectric actuator 24 is deactuated, i.e., a voltage of −150 volts is applied, as shown in FIG. 1, allowing the bias force of bias spring 25 to maintain nozzle valve element 18 in the inward closed position with valve surface 32 positioned in sealing abutment against valve seat 23 preventing fuel injection. At predetermined time determined by, for example, an electronic control unit (ECU), not shown, the ECU sends a voltage signal to piezoelectric actuator 24 actuating/energizing the actuator by applying a voltage, i.e., +150 volts, to the stack of piezoelectric elements causing the stack to expand. The expansion of the piezoelectric actuator 24 causing outward/downward movement of drive plunger 26 which in turn compresses hydraulic link 21 which in turn applies a downward force on nozzle valve element 18 causing element 18 to move from a closed position toward an open position, i.e., a low lift and/or a high lift position. The nozzle valve element 18 may be controlled to define a single injection event by lifting to only the low lift position and back to the closed position under certain engine operating conditions; lifting directly to high lift position by moving through the low lift position; lifting to the low lift position, pausing at the low lift position, and then continuing movement to the high lift position; or to lift to the low lift position early in the engine cycle to form an early preinjection, closing, and then lifting again to either the low or high lift position. Movement to the respective low and high lift positions is controlled by applying different voltages across the piezoelectric elements with a lower voltage achieving the low lift position and a higher voltage achieving the high lift position. To end an injection event, the voltage to the piezoelectric elements is reversed causing the stack to contract resulting in inward movement of drive plunger 26 which increases the size of, and lowers the fluid pressure in, hydraulic chamber 31 thereby allowing bias spring 25 to move nozzle valve element 18 inwardly to the closed position.

While various embodiments in accordance with the present invention have been shown and described, it is understood that the invention is not limited thereto. The present invention may be changed, modified and further applied by those skilled in the art. Therefore, this invention is not limited to the detail shown and described previously, but also includes all such changes and modifications.

We claim:

1. A fuel injector for injecting high pressure fuel into a combustion chamber of an internal combustion engine, comprising:
    an injector body containing an injector cavity and including a valve seat;
    a nozzle valve element positioned in said injector cavity, said nozzle valve element including a valve surface positioned adjacent said valve seat, a fuel delivery passage, and a plurality of spray holes fluidically connected to said fuel delivery passage, said nozzle valve element operable to move between a closed position with said valve surface positioned in sealing abutment with said valve seat to block fuel flow from said plurality of spray holes and an open position permitting flow from said spray holes, said nozzle valve element operable to move outwardly away from said injector body when moving from said closed position toward said open position, said nozzle valve element further including an annular groove formed adjacent said plurality of spray holes to receive fuel from said plurality of spray holes when said nozzle valve element is in said closed position; and
    a nozzle valve actuator assembly adapted to move said nozzle valve element toward said open position.

2. The injector of claim 1, wherein said open position includes a first lift position and a second lift position having a greater lift than said first lift position, at least one of said plurality of spray holes positioned adjacent said injector body when said nozzle valve element is in said first lift position to cause fuel flowing from said at least one spray hole to impinge on said injector body, said at least one spray hole positioned adjacent said injector body when said nozzle valve element is in said second lift position to cause fuel flowing from said at least one spray hole to avoid impingement on said injector body.

3. The injector of claim 1, wherein said fuel delivery passage extends axially along a central longitudinal axis of said nozzle valve element.

4. The injector of claim 3, wherein said injector body further includes a fuel supply port to receive high pressure fuel, said nozzle valve element including a transfer passage extending transverse, and fluidically connected, to said fuel delivery passage to receive high pressure fuel from said fuel supply port.

5. The injector of claim 1, wherein said nozzle valve actuator assembly includes a piezoelectric actuator.

6. The injector of claim 5, wherein said nozzle valve actuator assembly further includes a drive plunger positioned axially between said piezoelectric actuator and said nozzle valve element.

7. The injector of claim 6, wherein said nozzle valve actuator assembly further includes a hydraulic chamber to receive fuel to form a hydraulic link to transfer motion from said drive plunger to said nozzle valve element.

8. The injector of claim 7, wherein said nozzle valve actuator assembly further includes a bias spring positioned in said hydraulic chamber to bias said nozzle valve element toward said closed position.

9. A fuel injector for injecting high pressure fuel into a combustion chamber of an internal combustion engine, comprising:
   an injector body containing an injector cavity and including a valve seat;
   a nozzle valve element positioned in said injector cavity, said nozzle valve element including a valve surface positioned adjacent said valve seat, a fuel delivery passage, a plurality of spray holes fluidically connected to said fuel delivery passage, and an annular groove formed adjacent said plurality of spray holes, said nozzle valve element operable to move between a closed position with said valve surface positioned in sealing abutment with said valve seat to block fuel flow from said plurality of spray holes and an open position permitting flow from said spray holes, said nozzle valve element operable to move outwardly away from said injector body when moving from said closed position toward said open position, said annular groove being configured to receive fuel from said plurality of spray holes when said nozzle valve element in said closed position, and said open position including a first lift position and a second lift position having a greater lift than said first lift position, at least one of said plurality of spray holes positioned adjacent said injector body when said nozzle valve element is in said first lift position to cause fuel flowing from said at least one spray hole to impinge on said injector body and deflect toward said combustion chamber, said at least one spray hole positioned adjacent said injector body when said nozzle valve element is in said second lift position to cause fuel flowing from said at least one spray hole to avoid impingement on said injector body; and
   a nozzle valve actuator assembly adapted to move said nozzle valve element toward said open position.

10. The injector of claim 9, wherein said fuel delivery passage extends axially along a central longitudinal axis of said nozzle valve element.

11. The injector of claim 10, wherein said injector body further includes a fuel supply port to receive high pressure fuel, said nozzle valve element including a transfer passage extending transverse, and fluidically connected, to said fuel delivery passage to receive high pressure fuel from said fuel supply port.

12. The injector of claim 9, wherein said nozzle valve actuator assembly includes an actuating member, a drive plunger positioned axially between said actuating member and said nozzle valve element, and a hydraulic chamber configured to receive fuel to form a hydraulic link to transfer motion from said drive plunger to said nozzle valve element.

* * * * *